US010680699B2

(12) United States Patent
Lee et al.

(10) Patent No.: US 10,680,699 B2
(45) Date of Patent: Jun. 9, 2020

(54) METHOD AND APPARATUS FOR CALCULATING BEAMFORMING BASED PAGING OCCASION IN WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/653,292

(22) Filed: Jul. 18, 2017

(65) Prior Publication Data

US 2018/0026698 A1    Jan. 25, 2018

Related U.S. Application Data

(60) Provisional application No. 62/634,826, filed on Jul. 20, 2016.

(51) Int. Cl.
*H04B 7/06* (2006.01)
*H04B 7/0426* (2017.01)
*H04B 7/212* (2006.01)
*H04B 7/185* (2006.01)

(52) U.S. Cl.
CPC .......... *H04B 7/0639* (2013.01); *H04B 7/043* (2013.01); *H04B 7/0695* (2013.01); *H04B 7/2125* (2013.01); *H04B 7/1855* (2013.01)

(58) Field of Classification Search
CPC .................................................. H04B 7/0639
See application file for complete search history.

(56) References Cited

U.S. PATENT DOCUMENTS 9,591,645 B2 * 3/2017 Seol .................... H04W 72/046
9,750,003 B2 * 8/2017 Yu ....................... H04W 72/042
(Continued)

OTHER PUBLICATIONS

3rd Generation Partnership Project, "Technical Specification Group Services Radio Access Network; Evolved Universal Terrestrial Radio Access (E-UTRA); Radio Resource Control (RRC); Protocol specification (Release 13)", Section 5.3.2 of 3GPP TS 36.331 V13.2.0, Jun. 2016, 4 pages.
(Continued)

*Primary Examiner* — Andrew Lai
*Assistant Examiner* — Andrew C Lee
(74) *Attorney, Agent, or Firm* — Lee Hong Degerman Kang Waimey (57) ABSTRACT

According to the present invention, a user equipment (UE) calculates its paging occasion based on a specific beam to monitor paging. In detail, the UE selects at least one beam among multiple beams, calculates a paging occasion consisting of the at least one beam, and monitors a paging in the paging occasion. When the paging occasion consists of the multiple beams including the at least one beam, the paging may be monitored in a part of the paging occasion where the at least one beam is transmitted. Alternatively, when the paging occasion only consists of the at least one beam, the paging may be monitored in all of the paging occasion where the at least one beam is transmitted.

10 Claims, 7 Drawing Sheets

(56) References Cited

U.S. PATENT DOCUMENTS

| | | | |
|---|---|---|---|
| 2012/0294694 A1* | 11/2012 | Garot | F27D 1/141 411/427 |
| 2013/0010619 A1* | 1/2013 | Fong | H04W 74/002 370/252 |
| 2013/0016841 A1* | 1/2013 | Fong | H04L 5/001 380/287 |
| 2013/0121185 A1* | 5/2013 | Li | H04W 72/046 370/252 |
| 2013/0182626 A1* | 7/2013 | Kuo | H04W 52/0216 370/311 |
| 2013/0229965 A1* | 9/2013 | Bressanelli | H04W 52/0216 370/311 |
| 2013/0315321 A1* | 11/2013 | Rajagopal | H04L 27/2607 375/260 |
| 2014/0128109 A1* | 5/2014 | Li | H04W 68/02 455/458 |
| 2015/0049824 A1* | 2/2015 | Kim | H04B 7/0456 375/267 |
| 2015/0289147 A1* | 10/2015 | Lou | H04B 7/0408 370/329 |
| 2015/0358137 A1* | 12/2015 | Chae | H04L 1/1854 370/329 |
| 2016/0119895 A1* | 4/2016 | Agiwal | H04W 68/02 455/458 |
| 2016/0165583 A1* | 6/2016 | Ho | H04B 7/0408 370/329 |
| 2016/0241323 A1* | 8/2016 | Ko | H04B 7/0691 |
| 2016/0242159 A1* | 8/2016 | Ho | H04B 7/0408 |
| 2016/0337916 A1* | 11/2016 | Deenoo | H04W 8/22 |
| 2016/0373915 A1* | 12/2016 | Kim | H04W 76/14 |
| 2017/0257842 A1* | 9/2017 | Hessler | H04W 68/02 |
| 2017/0331577 A1* | 11/2017 | Parkvall | H04L 5/0053 |
| 2017/0346545 A1* | 11/2017 | Islam | H01Q 1/245 |
| 2018/0176065 A1* | 6/2018 | Deng | H04B 7/0695 |

OTHER PUBLICATIONS

3rd Generation Partnership Project, "Technical Specification Group Radio Access Network; Evolved Universal Terrestrial Radio Access (E-UTRA); User Equipment (UE) procedures in idle mode (Release 13)", Section 7 of 3GPP TS 36.304 V13.2.0, Jun. 2016, 5 pages.

* cited by examiner

FIG. 7

METHOD AND APPARATUS FOR CALCULATING BEAMFORMING BASED PAGING OCCASION IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/364,826, filed on Jul. 20, 2016, the contents of which are hereby incorporated by reference herein in its entirety.

BACKGROUND OF THE INVENTION

Field of the Invention

The present invention relates to wireless communications, and more particularly, to a method and apparatus for calculating a beamforming based paging occasion in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. Accordingly, when analog beamforming is used in NR, a method for transmitting a paging message efficiently may be required.

SUMMARY OF THE INVENTION

The present invention provides a method and apparatus for calculating a beamforming based paging occasion in a wireless communication system. The present invention provides broadcast transmission by using beamforming technology in new radio access technology (new RAT or NR).

In an aspect, a method for calculating a beamforming based paging occasion, by a user equipment (UE), in a wireless communication system is provided. The method includes selecting, by the UE, at least one beam among multiple beams, calculating, by the UE, a paging occasion consisting of the at least one beam, and monitoring, by the UE, a paging in the paging occasion.

In another aspect, a user equipment (UE) in a wireless communication system is provided. The UE includes a memory, a transceiver, and a processor, coupled to the memory and the transceiver, that selects at least one beam among multiple beams, calculates a paging occasion consisting of the at least one beam, and monitors a paging in the paging occasion.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
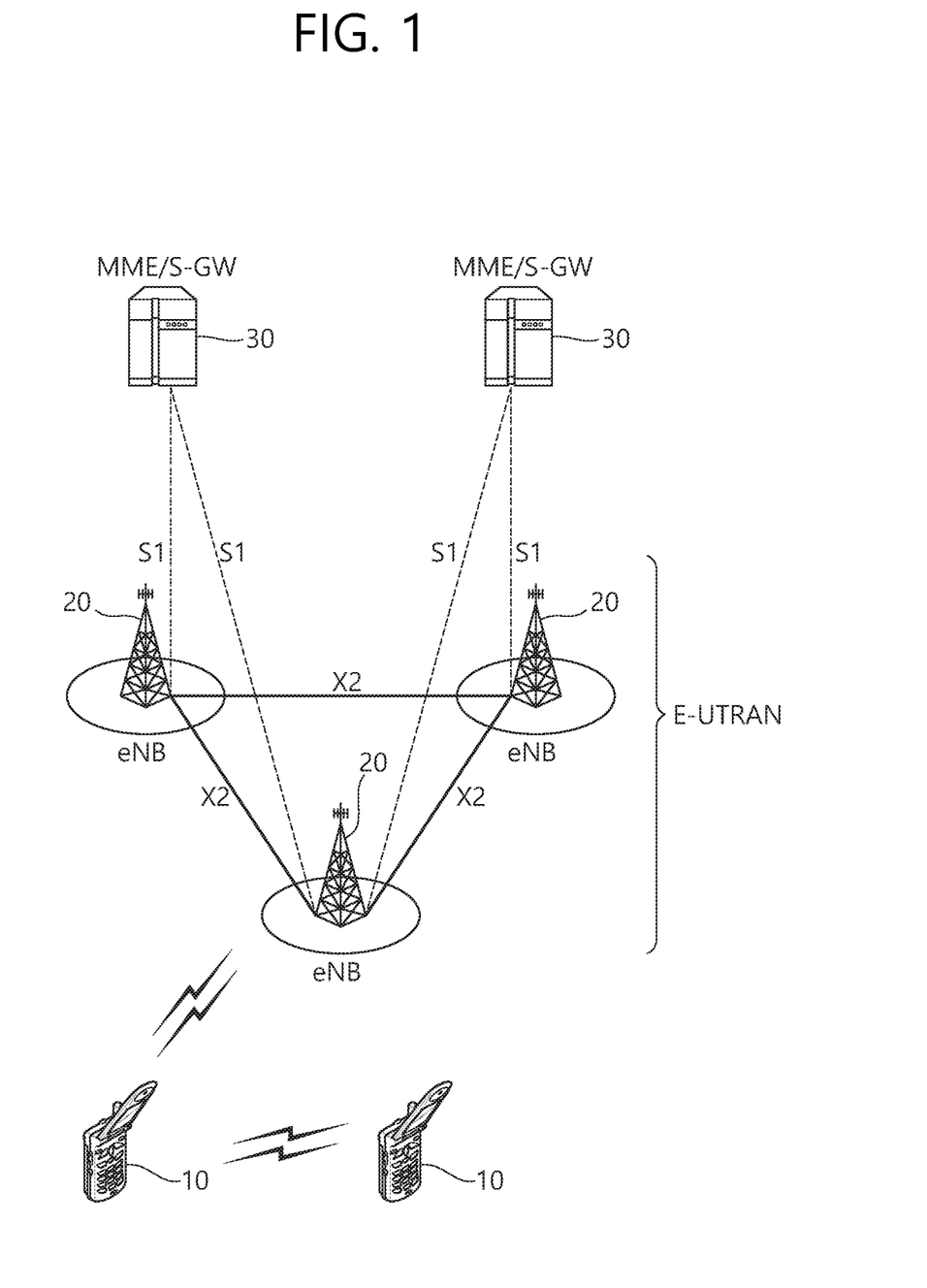
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
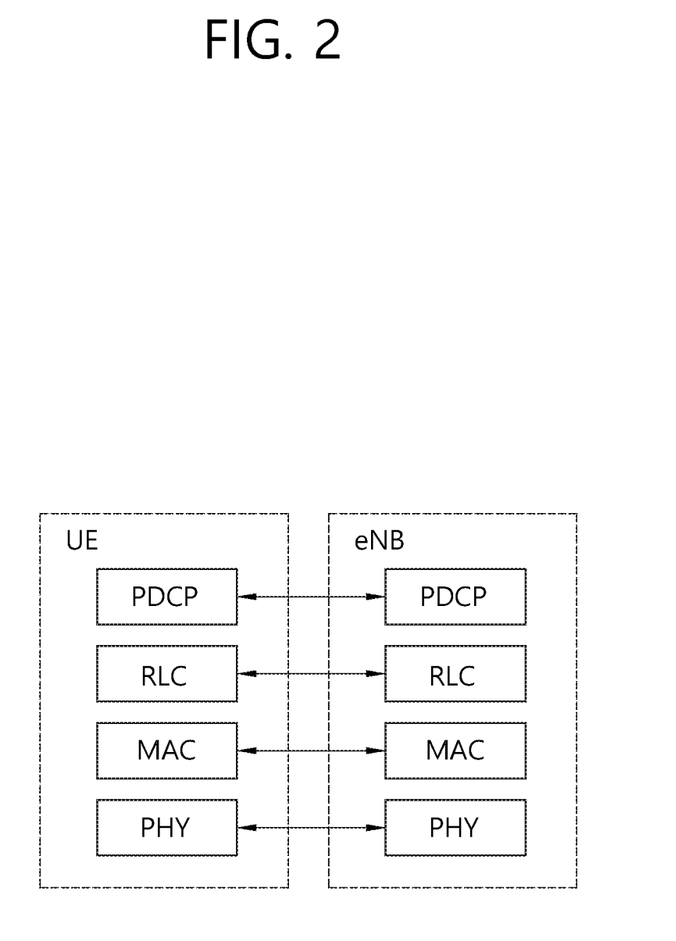
FIG. 2 shows a block diagram of a user plane protocol stack of an LTE system.
Figure 3:
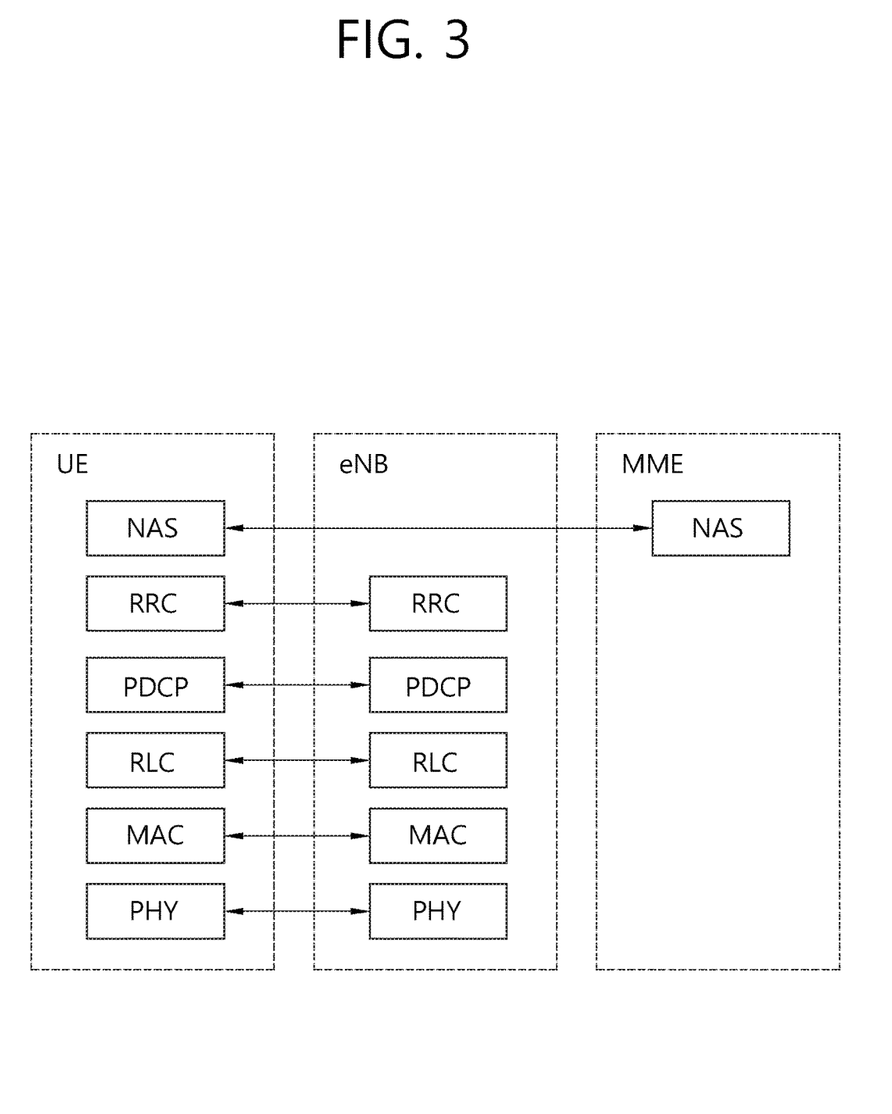
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change in order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Paging is described. It may be referred to as Section 5.3.2 of 3GPP TS 36.331 V13.2.0 (2016-06) and Section 7 of 3GPP TS 36.304 V13.2.0 (2016-06).

The purpose of the paging procedure is to transmit paging information to a UE in RRC_IDLE and/or, to inform UEs in RRC_IDLE and UEs other than narrowband internet-of-things (NB-IoT) UEs in RRC_CONNECTED about a system information change and/or, to inform UEs other than NB-IoT UEs about an earthquake and tsunami warning system (ETWS) primary notification and/or ETWS secondary notification and/or, to inform UEs other than NB-IoT UEs about a commercial mobile alert system (CMAS) notification and/or, to inform UEs other than NB-IoT UEs in RRC_IDLE about an extended access barring (EAB) parameters modification and/or, to inform UEs other than NB-IoT UEs in RRC_IDLE to perform E-UTRAN inter-frequency redistribution procedure. The paging information is provided to upper layers, which in response may initiate RRC connection establishment, e.g. to receive an incoming call.

Figure 4:
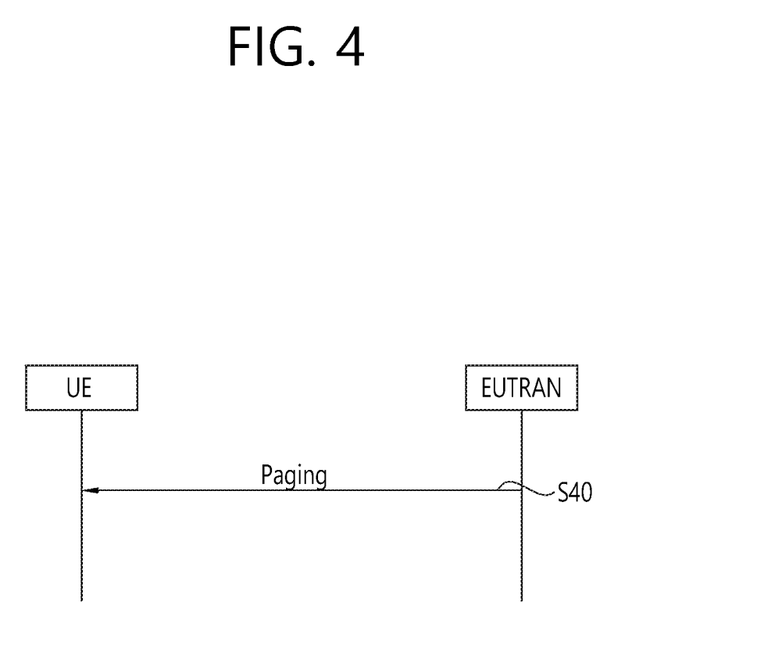
FIG. 4 shows a paging procedure.

FIG. 4 shows a paging procedure. In step S40, the E-UTRAN initiates the paging procedure by transmitting the Paging message at the UE's paging occasion. The E-UTRAN may address multiple UEs within a Paging message by including one PagingRecord for each UE. The E-UTRAN may also indicate a change of system information, and/or provide an ETWS notification or a CMAS notification in the Paging message.

Upon receiving the Paging message, the UE shall:

1> if in RRC_IDLE, for each of the PagingRecord, if any, included in the Paging message:

2> if the ue-Identity included in the PagingRecord matches one of the UE identities allocated by upper layers:

3> forward the ue-Identity and, except for NB-IoT, the en-Domain to the upper layers;

1> if the systemInfoModification is included; or

1> if the UE is configured with a discontinuous reception (DRX) cycle longer than the modification period and the systemInfoModification-eDRX is included:

2> re-acquire the required system information using the system information acquisition procedure.

1> if the etws-Indication is included and the UE is ETWS capable:

2> re-acquire SystemInformationBlockType1 immediately, i.e., without waiting until the next system information modification period boundary;

2> if the schedulingInfoList indicates that SystemInformationBlockType10 is present:

3> acquire SystemInformationBlockType10;

2> if the schedulingInfoList indicates that SystemInformationBlockType11 is present:

3> acquire SystemInformationBlockType11;

1> if the cmas-Indication is included and the UE is CMAS capable:
2> re-acquire SystemInformationBlockType1 immediately, i.e., without waiting until the next system information modification period boundary;
2> if the schedulingInfoList indicates that SystemInformationBlockType12 is present:
3> acquire SystemInformationBlockType12;
1> if in RRC_IDLE, the eab-ParamModification is included and the UE is EAB capable:
2> consider previously stored SystemInformationBlockType14 as invalid;
2> re-acquire SystemInformationBlockType1 immediately, i.e., without waiting until the next system information modification period boundary;
2> re-acquire SystemInformationBlockType14 using the system information acquisition procedure;
1> if in RRC_IDLE, the redistributionIndication is included and the UE is redistribution capable:
2> Perform E-UTRAN inter-frequency redistribution procedure;

The UE may use DRX in idle mode in order to reduce power consumption. One paging occasion (PO) is a subframe where there may be paging radio network temporary identifier (P-RNTI) transmitted on PDCCH or machine-type communication (MTC)-PDCCH (MPDCCH) addressing the paging message. In P-RNTI transmitted on MPDCCH case, PO refers to the starting subframe of MPDCCH repetitions.

One paging frame (PF) is one radio frame, which may contain one or multiple PO(s). When DRX is used the UE needs only to monitor one PO per DRX cycle. One paging narrowband (PNB) is one narrowband, on which the UE performs the paging message reception.

PF, PO, and PNB are determined by following formulae using the DRX parameters provided in system information. PF is given by Equation 1.

$$SFN \bmod T = (T \operatorname{div} N)*(UE\_ID \bmod N) \quad \text{<Equation 1>}$$

Index i_s pointing to PO from subframe pattern will be derived from Equation 2.

$$i\_s = \operatorname{floor}(UE\_ID/N) \bmod Ns \quad \text{<Equation 2>}$$

If P-RNTI is monitored on MPDCCH, the PNB is determined by Equation 3.

$$PNB = \operatorname{floor}(UE\_ID/(N*Ns)) \bmod Nn \quad \text{<Equation 3>}$$

System information DRX parameters stored in the UE shall be updated locally in the UE whenever the DRX parameter values are changed in system information. If the UE has no international mobile subscriber identity (IMSI), for instance when making an emergency call without universal subscriber identification module (USIM), the UE shall use as default identity UE_ID=0 in the PF, i_s, and PNB formulas above.

The following Parameters are used for the calculation of the PF, i_s, and PNB:
T: DRX cycle of the UE. If a UE specific extended DRX value of 512 radio frames is configured by upper layers, T=512. Otherwise, T is determined by the shortest of the UE specific DRX value, if allocated by upper layers, and a default DRX value broadcast in system information. If UE specific DRX is not configured by upper layers, the default value is applied.
nB: 4T, 2T, T, T/2, T/4, T/8, T/16, T/32.
N: min(T,nB).
Ns: max(1,nB/T)
Nn: number of PNBs provided in system information UE_ID: IMSI mod 1024, if P-RNTI is monitored on PDCCH, or IMSI mod 16384, if P-RNTI is monitored on MPDCCH.

IMSI is given as sequence of digits of type Integer (0 . . . 9), IMSI shall in the formulae above be interpreted as a decimal integer number, where the first digit given in the sequence represents the highest order digit.

The UE may be configured by upper layers with an extended DRX (eDRX) cycle $T_{eDRX}$. The UE may operate in extended DRX only if the cell indicates support for eDRX in system information.

If the UE is configured with a $T_{eDRX}$ cycle of 512 radio frames, it monitors POs with parameter T=512. Otherwise, a UE configured with eDRX monitors POs (i.e, based on the upper layer configured DRX value and a default DRX value), during a periodic paging time window (PTW) configured for the UE or until a paging message including the UE's NAS identity is received for the UE during the PTW, whichever is earlier. The PTW is UE-specific and is determined by a paging hyperframe (PH), a starting position within the PH (PTW_start) and an ending position (PTW_end). PH, PTW_start and PTW_end are given by the following formulae. The PH is the H-SFN satisfying Equation 4.

$$H\text{-}SFN \bmod T_{eDRX,H} = (UE\_ID \bmod T_{eDRX,H}), \text{ where} \quad \text{<Equation 4>}$$

UE_ID: IMSI mod 1024
$T_{eDRX,H}$: eDRX cycle of the UE in hyper-frames, ($T_{eDRX,H}$=1, 2, . . . , 256 hyper-frames) and configured by upper layers PTW_start denotes the first radio frame of the PH that is part the PTW and has SFN satisfying Equation 5.

$$SFN = 256*i_{eDRX}, \text{ where } i_{eDRX} = \operatorname{floor}(UE\_ID/T_{eDRX,H}) \bmod 4 \quad \text{<Equation 5>}$$

PTW_end is the last radio frame of the PTW and has SFN satisfying Equation 6.

$$SFN = (PTW\_start + L*100 - 1) \bmod 1024, \text{ where } L = PTW \text{ length (in seconds)} \quad \text{<Equation 6>}$$

configured by upper layers

Analog beamforming is described. 5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It has been discussed to introduce millimeter wave (mmW) in NR. In case of mmW, the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

In NR, it may be challenging to provide broadcast transmission by using beamforming technology. Hereinafter, a method for calculating a beamforming based paging occasion is described according to an embodiment of the present invention. In the present invention, the UE may calculate its paging occasion based on a specific beam to monitor paging. The specific beam may be selected based on beam quality. The paging occasion may consist of either multiple beams or a single beam. If the paging occasion consists of multiple beams, the UE may monitor only a part of the paging occasion where the specific beam is transmitted. If the paging occasion consists of a single beam, the UE may monitor a whole of the paging occasion where the specific beam is transmitted.

Figure 5:
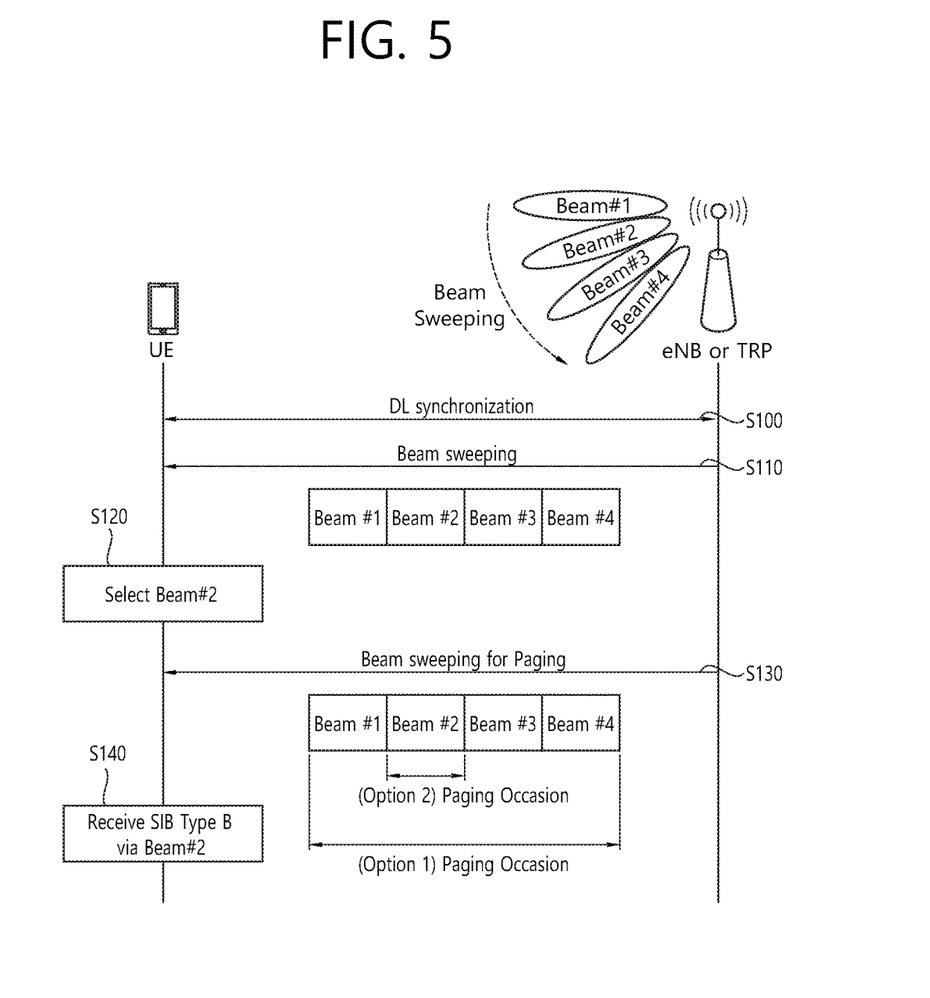
FIG. 5 shows a method for calculating a beamforming based paging occasion according to an embodiment of the present invention.

FIG. 5 shows a method for calculating a beamforming based paging occasion according to an embodiment of the present invention. In this embodiment, a network node, e.g. eNB or transmission/reception point (TRP), may sweep its antenna beams fully or partially for DL transmission. It means that the eNB or TRP may perform DL transmission by using multiple beams. Hereinafter, for the convenience, eNB is used for the network node, but the present invention is not limited thereto.

In step S100, the UE performs DL synchronization with the eNB. The UE may receive master information block (MIB) and/or system information block (SIB) from the eNB. The MIB and/or SIB may carry system frame number (SFN) and/or hyper SFN.

In step S110, the eNB transmits multiple beams in a beam sweeping period by using beam sweeping. The eNB may fully or partially sweep its antenna beams. Different beams may be transmitted at different time intervals, e.g. subframes or symbols possibly with beam reference signal (BRS). In FIG. 5, eNB transmits beam #1, #2, #3 and #4 in the beam sweeping period by using beam sweeping.

In step S120, the UE measures quality of each beam among the multiple beams. The multiple beams may be transmitted at different time intervals. The UE selects at least one beam among the multiple beams. The UE may select one beam among the multiple beams which provides the highest measured quality among the multiple beams. Alternatively, the UE may select one or more beams among the multiple beams, and the selected one or more beams may provide the measured quality, which is above a threshold or is not below a threshold. In FIG. 5, it is assumed that beam #2 is selected.

Upon selecting at least one beam (e.g. beam #2), the UE calculates a paging interval where the UE should monitor a paging channel to receive a paging indicator or a paging message. The paging interval may correspond to the paging occasion. Alternatively, the paging interval may correspond to one of the paging time window, the paging (radio) frame and/or the paging hyper frame. In FIG. 5, it is assumed that the paging interval is the paging occasion. The paging indicator may be a RNTI, such as the P-RNTI on PDCCH. The paging indicator may indicate at least one of a group of UEs, a group of UE identities, a particular type of UE (e.g. delay tolerant devices or vehicular UEs), a particular UE category, a particular service, or a group of services.

The paging interval may be calculated based on UE ID. The paging interval may be calculated further based a beam index of the selected beam (e.g. beam #2). That is, in FIG. 5, the paging occasion may be calculated based on UE ID and/or a beam index of the selected beam (e.g. beam #2). The paging interval may be calculated further based on a number of the multiple beams. The paging interval may be calculated further based on a number of beams provided in a cell. The paging interval may be calculated further based on a number of multiple beams in a carrier corresponding to the cell. The paging interval may be calculated further based on a number of synchronization signal (SS) blocks. The paging interval may be calculated further based on a periodicity of SS block transmission.

In step S130, the eNB transmits the paging indicator and/or the paging message in the paging occasion via one or more beams. Here, two options may be considered. For Option 1, the paging occasion may consist of multiple beams where transmission of the same paging indicator and/or the same paging message(s) is repeated. The eNB may perform beam sweeping in the paging occasion to transmit the same paging indicator and/or the same paging message(s) via multiple beams. Alternatively, for Option 2, the paging occasion may consist of a single beam where the paging indicator and/or the paging message(s) is transmitted. The eNB may perform beam sweeping in multiple (contiguous) paging occasions to transmit the same paging indicator and/or the same paging message(s).

In step S140, the UE monitors a paging channel to receive the paging indicator or the paging message in the calculated paging occasions. As described above, the paging occasion may consist of either multiple beams (Option 1) or a single beam (Option 2). For the Option 1, the UE may monitor only a particular time interval of the paging occasion where the selected beam is scheduled to be transmitted. For the Option 2, the UE may monitor a whole of the paging occasion where the selected beam is scheduled to be transmitted. The paging message may be transmitted over physical downlink shared channel (PDSCH). The UE may receive SIB type B via beam 32.

Figure 6:
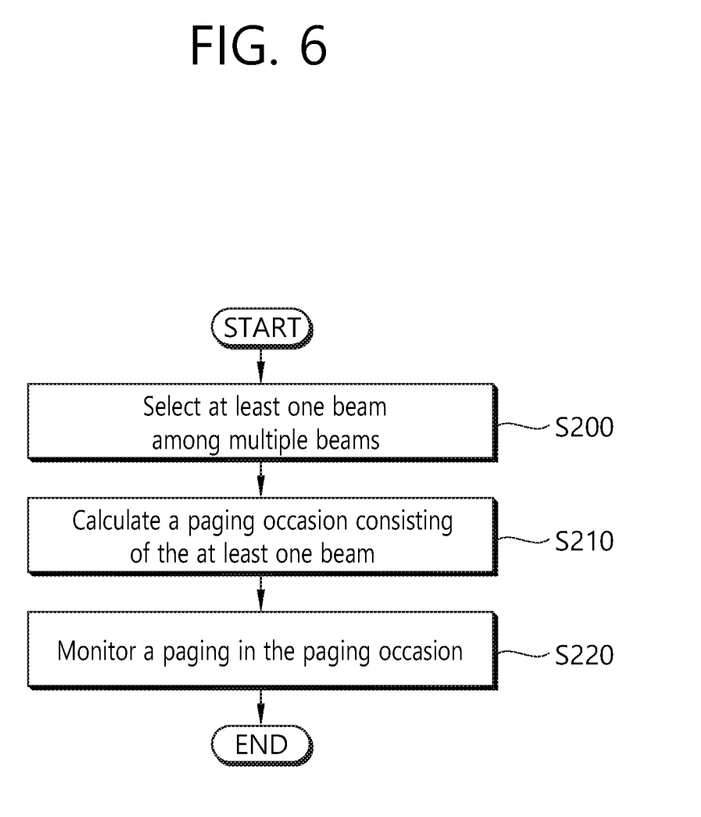
FIG. 6 shows another method for calculating a beamforming based paging occasion according to an embodiment of the present invention.

FIG. 6 shows another method for calculating a beamforming based paging occasion according to an embodiment of the present invention. The present invention described above may be applied to this embodiment.

In step S200, the UE selects at least one beam among multiple beams. The at least one beam may have a highest quality among the multiple beams. Or, the at least one beam may have a quality above a threshold.

In step S210, the UE calculates a paging occasion consisting of the at least one beam. The paging occasion may be calculated based on a beam index of the at least one beam. The paging occasion may be calculated based on a number of the multiple beams. The paging occasion may be calculated based on a number of beams provided in a cell. The paging occasion may be calculated based on a number of beams in a carrier corresponding to the cell. The paging occasion is calculated based on a number of SS blocks. The paging occasion may be calculated based on a periodicity of SS block transmission.

In step 220, the UE monitors a paging in the paging occasion. The paging may include a paging message or a paging indicator. The paging indicator may correspond to a P-RNTI.

The paging occasion may consist of the multiple beams including the at least one beam. In this case, the paging may be monitored in a part of the paging occasion where the at least one beam is transmitted. Alternatively, the paging occasion may only consist of the at least one beam. In this case, the paging may be monitored in all of the paging occasion where the at least one beam is transmitted.

Figure 7:
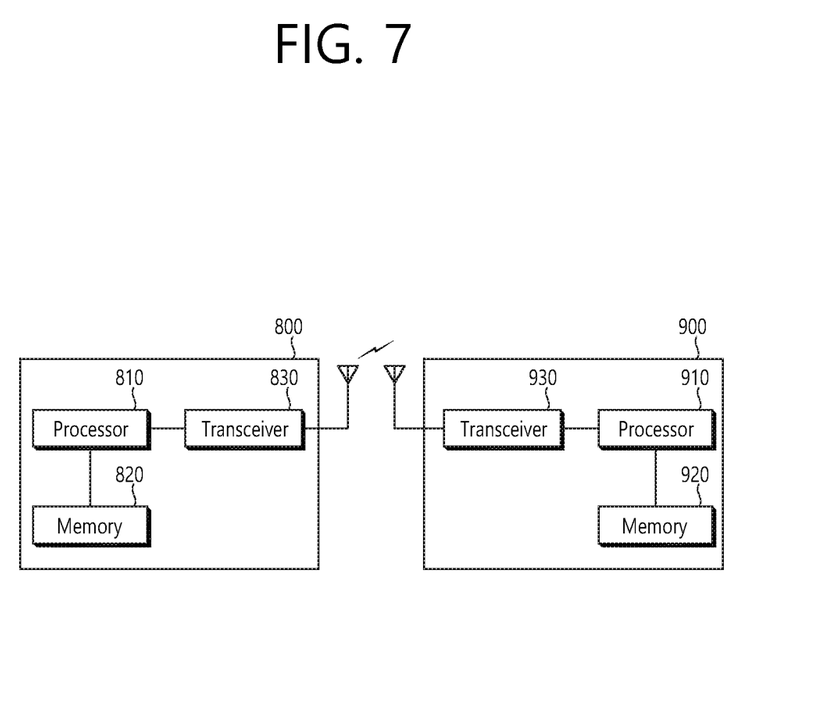
FIG. 7 shows a wireless communication system to implement an embodiment of the present invention.

FIG. 7 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, when analog beamforming is used in NR, a paging occasion can be calculated based on a beam index as well as UE ID, thereby a paging can be monitored efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
   receiving, from a base station, reference signals that are transmitted through multiple transmission (Tx) beams of the base station;
   determining a paging occasion comprising time intervals for a paging channel monitoring based on an identifier (ID) of the wireless device,
   wherein each of the time intervals is mapped to each of the multiple Tx beams of the base station through which the reference signals are transmitted; and
   monitoring a paging channel in a time interval among the time intervals in the paging occasion,
   wherein the time interval is mapped to a Tx beam of the base station selected by the wireless device among the multiple Tx beams of the base station, and
   wherein a same paging is transmitted repeatedly from the base station through the multiple Tx beams of the base station in the time intervals in the paging occasion.

2. The method of claim 1, wherein the selected Tx beam of the base station has a highest quality among the multiple Tx beams of the base station.

3. The method of claim 1, wherein the selected Tx beam of the base station has a quality above a threshold.

4. The method of claim 1, wherein the paging includes a paging message or a paging indicator.

5. The method of claim 4, wherein the paging indicator includes a paging radio network temporary identity (P-RNTI).

6. The method of claim 1, wherein the paging occasion is determined based on a number of the multiple Tx beams of the base station.

7. The method of claim 1, wherein the paging occasion is determined based on a number of beams provided in a cell.

8. The method of claim 7, wherein the paging occasion is determined based on a number of beams in a carrier on which the cell is served.

9. A wireless device in a wireless communication system, the wireless device comprising:
   a memory;
   a transceiver; and
   at least one processor, coupled to the memory and the transceiver, configured to:
      control the transceiver to receive, from a base station, reference signals that are transmitted through multiple transmission (Tx) beams of the base station,
      determine a paging occasion comprising time intervals for a paging channel monitoring based on an identifier (ID) of the wireless device, wherein each of the time intervals is mapped to each of the multiple Tx beams of the base station through which the reference signals are transmitted, and
      monitor a paging channel in a time interval among the time intervals in the paging occasion,
      wherein the time interval is mapped to a Tx beam of the base station selected by the wireless device among the multiple Tx beams of the base station, and
      wherein a same paging is transmitted repeatedly from the base station through the multiple Tx beams of the base station in the time intervals in the paging occasion.

10. The wireless device of claim 9, wherein the selected Tx beam of the base station has a quality above a threshold.

* * * * *